June 28, 1960 C. R. HOOVER 2,942,808
REVOLVING AIRCRAFT SKI
Filed Aug. 15, 1955 3 Sheets-Sheet 1

INVENTOR
Curtis R. Hoover, Deceased
By Christina Hoover,
Administratrix
By:- *[signature]*
ATTORNEY

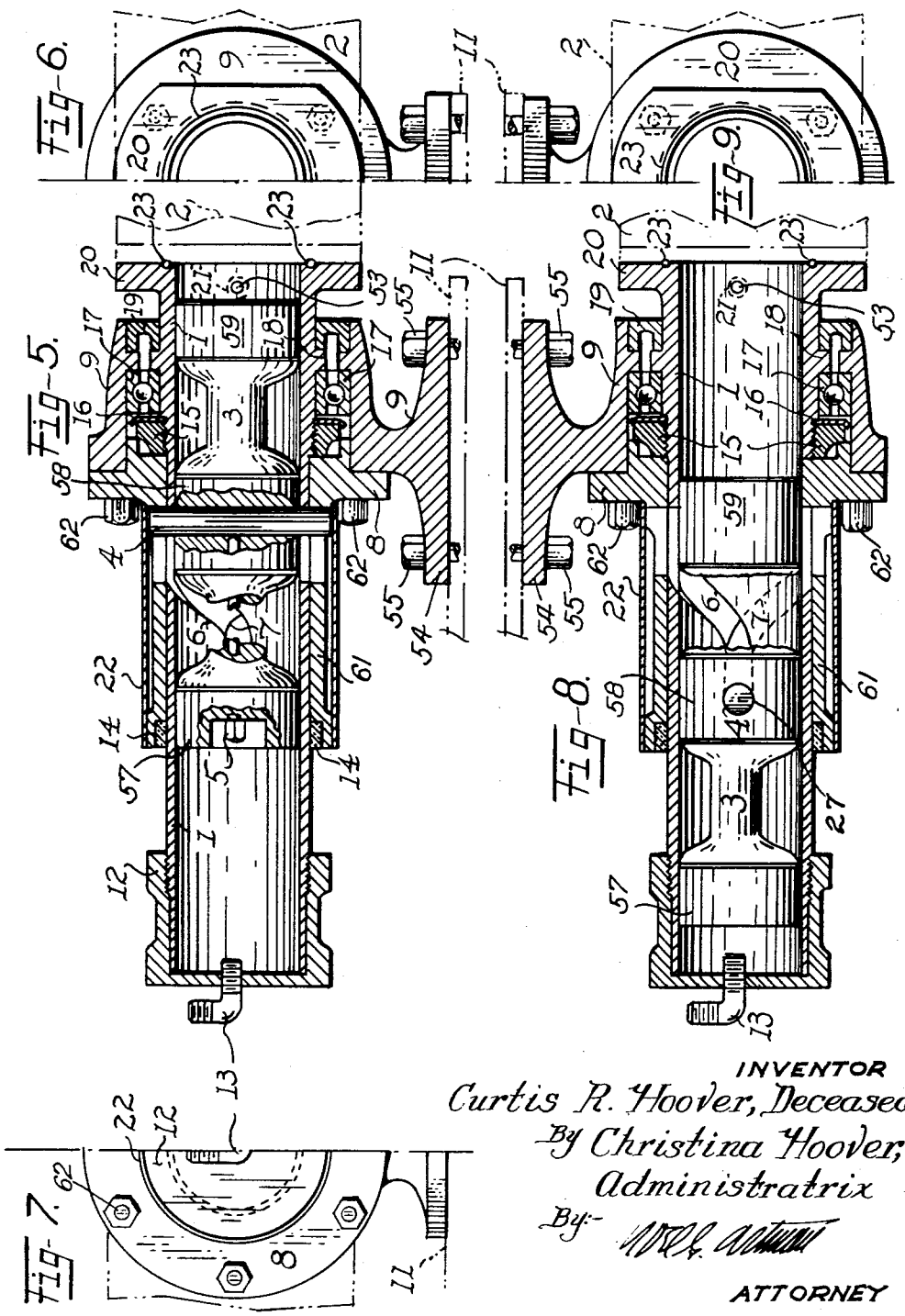

June 28, 1960  C. R. HOOVER  2,942,808
REVOLVING AIRCRAFT SKI
Filed Aug. 15, 1955  3 Sheets-Sheet 3
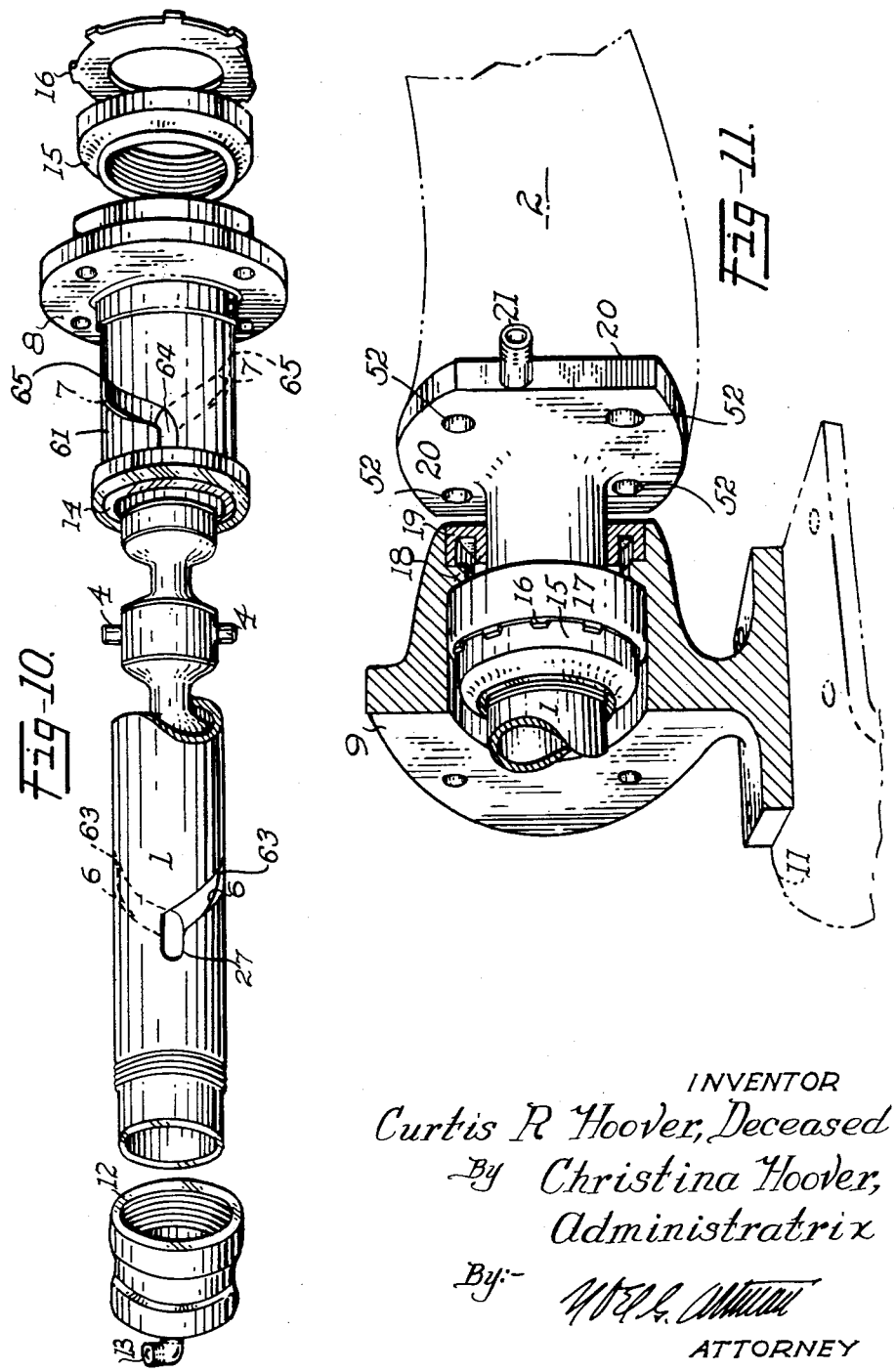
INVENTOR
Curtis R. Hoover, Deceased
By Christina Hoover,
Administratrix
ATTORNEY

United States Patent Office 2,942,808
Patented June 28, 1960

2,942,808
REVOLVING AIRCRAFT SKI

Curtis R. Hoover, deceased, late of 9609 120th Ave., Edmonton, Alberta, Canada, by Christina Hoover, executrix, Edmonton, Alberta, Canada Filed Aug. 15, 1955, Ser. No. 528,453

6 Claims. (Cl. 244—103)

The invention herein relates generally to aircraft landing apparatus and more particularly to an aircraft landing mechanism that may be changed selectively while the aircraft is in flight from wheels to skis or vice versa. The apparatus also includes improvements in mechanical movement which while particularly useful in conjunction with aircraft landing apparatus is also capable of other uses.

Prior mechanisms for changing the landing apparatus of an aircraft so that either the wheels or the skis might be placed into position, depending upon the type of surface on which it was intended to land the aircraft, have included an eccentric crank arrangement manipulable to drop either the skis or the wheels into the lowered position attendant to the other being raised. Another selective landing mechanism has employed an opening in the ski through which the landing gear wheel may be depressed or raised when required. The above and other mechanisms have the disadvantage of requiring a large degree of skill on the part of an aircraft pilot to land his craft on the wheels without damaging the ski structure. This is caused principally by the fact that it is impossible to lower the aircraft wheels to any distance below the aircraft ski without unduly lengthening the undercarriage of the aircraft.

It is therefore the principal object of the present device to provide an aircraft landing mechanism wherein the aircraft ski is selectively revolvable to and from a position below the aircraft wheel.

An additional object of my device is to provide mechanism that will revolve the aircraft ski while the aircraft is in flight.

A further object is to provide apparatus of the aforesaid character having a minimum of parts and that may be manufactured from readily obtainable low cost materials.

Additional objects and advantages of my device will become obvious to those skilled in the art on reading the following specification in the light of the attached drawings. It must be understood that the information disclosed therein is by way of illustration and example only and is not to be construed as a limitation.

In the drawings illustrating one preferred embodiment of my idea Fig. 1 is a fragmentary side elevational view illustrating an aircraft undercarriage modified in accordance with my device and showing the undercarriage in position for landing on skis.

Fig. 5 is a vertical longitudinal sectional view of the ski revolving mechanism embodying my invention.

Fig. 6 is a view of the right end of the mechanism illustrated in Fig. 5.

Fig. 7 is a view of the left end of the mechanism illustrated in Fig. 5.

Fig. 8 is a view similar to Fig. 5 but illustrating the relative position of the movable elements when operated to revolve the ski 180 degrees with respect to Fig. 5.

Fig. 9 is a view of the right end of the mechanism illustrated in Fig. 8.

Fig. 10 is an exploded side elevational view of the parts illustrated in Figs. 5 and 8.

Fig. 11 is a perspective view partly in section, illustrating the portions of the mechanism for attachment to the wheel yoke.

Figure 1:
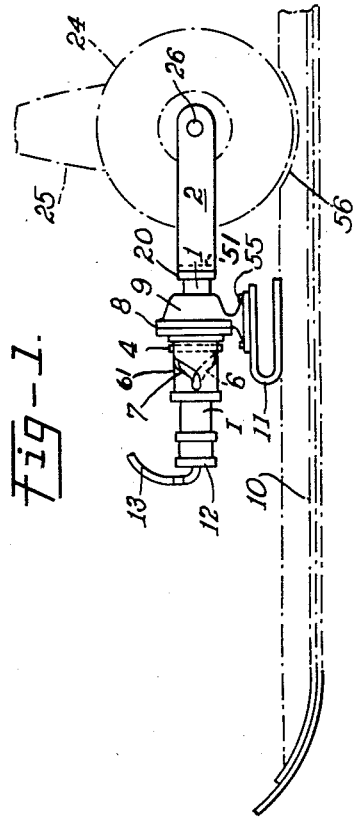
Figure 3:
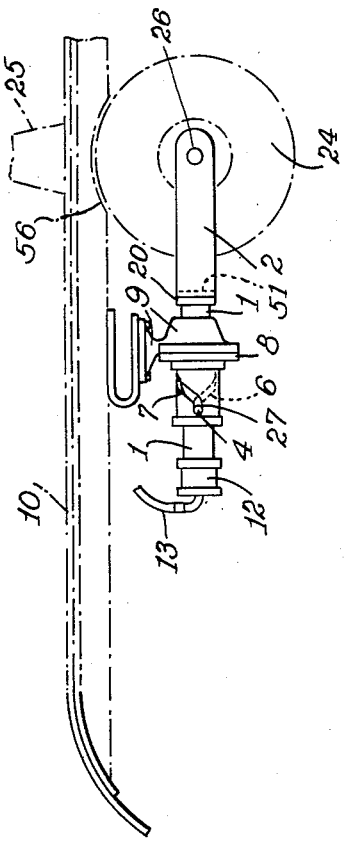
Fig. 3 is a fragmentary side elevational view similar to Fig. 1 and illustrating the landing gear adjusted for landing on wheels.

With continued reference to the drawings and particularly Figs. 1 through 4 there is shown in dot-dash lines one wheel 24 of an aircraft undercarriage leg 25. This wheel is journalled upon an axle 26 having one end mounted in the undercarriage leg. Straddling the wheel 26 is a U-shaped ski supporting structure or yoke 2. This U-shaped structure has the rear ends of its two legs non-rotatively mounted upon the axle 26 at opposite sides of the wheel 24 and projecting horizontally forwardly with respect to the aircraft (not shown). A plunger guide tube or inner cylinder 1 has a flange 20 upon its rearmost end secured to the flat forward face of the U-shaped structure bight 51 by means of bolts (not shown) which respectively extend through holes 52, Fig. 11, in the flange 20. A sealing O-ring 23 coaxial with the bore of the cylinder 1 Figs. 5 and 8, is disposed between the flange 20 and the bight 51 of the U-shaped supporting structure 2. Communication to the interior of such cylinder is provided through a hose coupling member 21 and a radial bore 53 in which the member 21 is mounted. The forward end of the cylinder is communicated with by an L-shaped hose coupling member 13 mounted in a closure end cap 12 of the cylinder.

Figure 2:
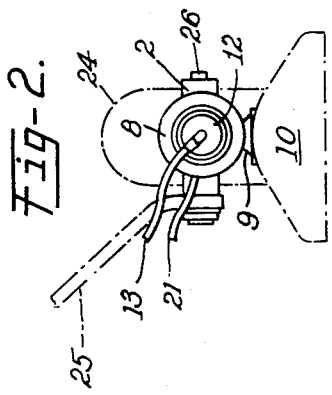
Fig. 2 is an end view projected on Fig. 1.

A ski supporting member in the form of a mounting ring 9 is journalled co-axially about the cylinder 1 by means of a ball bearing unit 17. The inner race of this ball bearing unit is secured to the cylinder 1 and prevented against axial movement thereon by a radial flange 18 and a nut 15 screwed onto the exterior periphery of the cylinder. A lock washer 16 is disposed between the nut 15 and the inner race of the bearing unit. A sealing ring 19 for the bearing 17 is disposed between the interior of a rear end portion of the ring 9 and the exterior of the cylinder 1. The ski supporting ring 9 has a mounting pad 54 for the attachment of one leg of a U-shaped spring member 11 by means of cap screws 55. The other leg of the spring member 11 has a ski 10, shown in dot-dash lines, mounted thereon to extend substantially in parallelism with the principal axis of the cylinder 1 about which the mounting ring is rotatable for swinging or revolving the ski. A portion of the ski 10 adjacent the wheel 24 has a wheel clearance notch 56 formed therein to diminish the radial distance that the ski can be mounted from the axis of the cylinder 1. When the ski is revolved about the axis of the cylinder 180 degrees counterclockwise from the position this ski is shown in Fig. 2, such ski will be disposed in the inoperative position enabling the aircraft to land upon the wheel 24. While only one wheel and ski have been shown, the conventional aircraft will of course have two such wheels similarly associated with a ski 10 and both skis will be raised to the position shown in Figs. 3 and 4 when making a normal landing upon a cleared landing strip.

Figure 4:
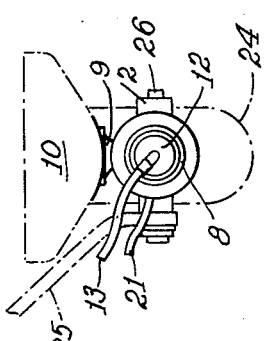
Fig. 4 is an end view projected on Fig. 3.

When it is desired to land the aircraft upon a surface of snow or ice the ski will be swung or revolved about the axis of the cylinder 180 degrees clockwise from the Fig. 4 position into the Fig. 2 position which is also illustrated in Fig. 1. After the ski 10 has come into contact with the landing surface and the aircraft imposes weight through the strut 25, axle 26 and the supporting structure 2, the force of this weight will flex the spring 11 and allow the lower side of the wheel 24 to bear upon that portion of the ski immediately therebeneath wherefore it is unnecessary for the U-shaped structure 2 and the spring 11 to support the entire weight of the aircraft.

Means for selectively determining the operating position or the retracted upwardly swung position of the ski while the aircraft is in flight includes a tri-nodal plunger 3. This plunger comprises a forward cylindrical node or enlargement 57, a center node 58 and a rear node 59. A diametric wrist pin 4 is mounted in the plunger node 58 where it is anchored by a long shanked set screw 5 projecting axially into the plunger from its forward end. Outer end portions of the pin 4 project through respective spiral slots 6 in the tube or plunger guide means 1 and into respective spiral slots 7 of a tubular driven cam element 61 where these outer end portions of the pin constitute driving elements for the driven element 61. The driven cam element 61 is rotatively mounted upon the cylinder 1 and has a flange 8 upon its rearmost end secured to the ski mounting ring 9 by cap screws 62. Thus the ski mounting ring 9 and the tubular driven cam element 61 are constrained for rotation in unison wherefore this cam element can rotatively drive the ski mounting ring while the latter holds the cam element 61 against axial movement. In a sense the element 61 is a tubular sleeve extension of the mounting ring 9, and the cylinder 1 and the element 61, relatively to one another, are inner and outer cylinders. The ski supporting member or ring 9 in effect includes this outer cylinder. A tubular guard member 22 cooperates with a sealing ring 14 to contain lubricant which otherwise would escape through the spiral slots 6 and 7 onto exterior parts of the apparatus. The guard 22 also prevents accidental loss of the pin 4 in the event of the set screw 5 becoming loosened.

In Fig. 10 it can be seen that the diametrically opposite spiral slots 6 in the cylinder or plunger guide tube 1 extend 90 degrees circumferentially of this tube. An axially extending portion 27 is at the forward end of each of these slots and an axially extending end portion 63 is at the rearward end of each thereof. The pitch direction of these spiral slots 6 is such that the spiral sides react against the plunger-mounted pin 4 for causing clockwise rotation of the plunger as viewed from the front end of the tubular member 1 attendant to the plunger and pin 4 being moved axially rearwardly in such tube, that is, rightward as viewed in Figs. 1, 3 and 10. Movement of the plunger 3 forwardly through a complete stroke from the retracted position where the pin end portions are in the slot end portions 63 until they are disposed within the slot end portions 27 causes the plunger to rotate 90 degrees counterclockwise, whereas complete retraction of the plunger for again disposing the ends of the pin 4 in the slot end portion 63 causes a retractive 90 degree rotation of such plunger clockwise. Forward motion of the plunger 3 is incurred by introducing fluid, preferably oil, under pressure through the hose coupling 21 into the rear end of the tube 1 while exhausting fluid from the forward end of the tube through the hose coupling 13. Retractive axial movement of the plunger is accomplished by reversing the flow of fluid to force such fluid under pressure into the left end of the tube through the hose coupling 13 while exhausting fluid from the right or rear end of the tube from the hose coupling 21.

Referring again to Fig. 10, it can be seen that the spiral slots 7 of which the sides constitute a helical cam profile for the cam driven element 61 also extend 90 degrees circumferentially of such driven cam element. However, the pitch direction of these cam profiles is opposite to that of the slots 6 in the cylinder 1. That is, the cam slots or profiles 7 progress counterclockwise about the tubular driven cam element 61 as viewed from the left end thereof as they progress rearwardly from horizontal end portions 64 thereof to horizontal rear end portions 65 thereof, whereas the slots 6 progress clockwise as they extend rearwardly from the horizontal forward end portions 27 to the rearward horizontal end portions 63. Therefore assuming that the plunger 3 is in its forwardmost position so the outer end portions of pin 4 are in the end portions 27 of the slots 6 and in the end portions 64 of the cam profile slots 7, retractive movement of the plunger will cause the pin 4 to react against the sides of slots 6 for causing clockwise 90 degree rotation of the plunger attendant to a full stroke retractive motion carrying the pin into the slot end portions 63. Since the pin end portions are also disposed within the driven cam member slots 7, this 90 degree revolving motion of the pin end portions imparts a 90 degree component of rotative movement to the driven cam element 61. Also since the driven cam element 61 is restrained against axial movement, the rearward linear component of movement of the pin 4 causes camming action of its end portions against the side of the profile slots 7 for imparting an additional 90 degree component of rotative movement to the driven cam element 61, wherefore attendant to a complete retractive stroke of the plunger 3 the driven cam element 61 will be rotated 180 degrees clockwise. Since the ski mounting ring 9 and the ski 10 are constrained for rotation with the driven cam element 61, this retractive stroke of the plunger 3 is effective for revolving this ski 10 from its non-operative position shown in Figs. 3 and 4 to its operative position shown in Figs. 1 and 2. When it is desired to again swing the ski from its operative position of Figs. 1 and 2 to its non-operative position of Figs. 3 and 4 fluid will be introduced into the rear end of the tube 1 through the hose coupling 21 for protracting the plunger 3 forwardly a complete stroke whereupon helical slots 6 in the tube 1 cause a counterclockwise rotation of the plunger 90 degrees causing the outer ends of the plunger pin 4 to cooperate with the complemental cam slots 7 of the driven cam member 61 for imparting 180 degrees rotation to this driven cam member and thereby swing the ski 180 degrees counterclockwise as viewed in Fig. 2 to the retracted position shown in Figs. 3 and 4.

While the end portions of pin 4 are disposed in the forward end portions 27 of the slots 6 and the forward end portions 64 of the cam slots 7, these pin end portions are effective for locking the cam elements 61 and the ski 10 against movement about the axis of the tube 1 without the need of significant fluid pressure acting upon the plunger 3. Similar locking of the cam element 61 and the ski against movement about the axis of tube 1 occurs when the end portions of pin 4 are disposed in the rear end portions 63 and 65 of the slots 6 and 7.

Having described a single preferred embodiment of the invention with the view and concisely illustrating the same, what is claimed is:

1. The combination with a wheeled undercarriage for aircraft; aircraft landing skis; means for mounting such skis onto the wheeled undercarriage comprising inner cylinders rotatively and axially fixed to the undercarriage respectively adjacent the wheels with the axis of each cylinder arranged horizontally and radially of its associated wheel, driven cam elements in the form of outer cylinders respectively mounted rotatively on the inner cylinders, means constraining the outer cylinders against axial movement, the inner cylinders having spiral slots extending axially of their side walls and spirally about the cylinder axes, the outer cylinders having spiral slots like those of the inner cylinders but of which the pitch is opposite to that of the inner cylinder slots, and means for securing the skis respectively on the outer cylinders in parallelism with the cylinder axes and spaced therefrom a distance that selective oscillative rotation of the outer cylinders places the skis alternately above or below the wheels; wrist pins in the inner cylinders and extending radially outwardly through the slots in both the inner and outer cylinders; means for moving the pins selectively oppositely axially of the cylinders and in the slots to cooperate with the slots for effecting said selective oscillative rotation of the outer cylinders; and means for locking the skis in position selectively above and below the wheels.

2. The combination set forth in claim 1, wherein the means for locking the skis selectively above and below the wheels comprises end extensions of the cylinder slots and which extensions depart from the spiral formation to extend substantially axially of the cylinders, and the extensions at corresponding ends of the slots being receptive of the pins to hold the cylinders against relative rotation.

3. In combination with an aircraft undercarriage including a landing wheel; a supporting structure mounted on the undercarriage adjacent said wheel; a ski supporting member carried by said supporting structure and oscillatable about an axis of such member extending fore and aft of the aircraft, said axis also extending radially of and intersecting the wheel; a plunger device comprising a plunger guide tube mounted on the supporting structure co-axially of said supporting member axis and constrained by said supporting structure against rotation about such axis, and a plunger movable axially in said tube, the tube having a side wall slot extending helically about said axis in one direction of pitch; a driving cam element mounted on the plunger and projecting radially thereof through said slot and guided by the slot to move in a helical path coincident with said slot attendant to axial movement of the plunger; a driven cam element mounted rotatively upon the plunger guide tube; and means constraining the driven cam element against movement axially of the tube and such driven cam element being connected with the ski supporting member for rotating the latter therewith, the driven cam element containing a helical cam profile extending about the tube axis in the opposite pitch direction to that of the tube wall slot, and said profile being receptive of the driving cam element to impart rotative movement to the ski supporting structure attendant to both the axial and rotative components of the helical motion of such driving element.

4. In combination with an aircraft under-carriage including a landing wheel, a supporting structure mounted on the under-carriage adjacent said wheel, a plunger guide cylinder mounted non-rotatively and constrained against axial movement upon said supporting structure and projecting horizontally radially of said wheel within the plane thereof, said cylinder having a side wall slot extending helically therein in one pitch direction, a plunger reciprocally mounted in said cylinder and having a pin projecting radially therefrom outwardly through said slot, a ski supporting member mounted rotatively about said cylinder and having a sleeve extension projecting co-axially about the cylinder in registry with said slot, the sleeve extension having a slot extending helically therein in the opposite pitch direction of the cylinder slot and also receiving a section of said pin, means for selectively conducting fluid under pressure into opposite ends of the cylinder to force said plunger endwise therein attendant to the cylinder slot co-acting with the pin for rotating such pin and the plunger co-axially of the cylinder, and for causing the rotating pin to co-act with the slot in the sleeve extension for imparting additional rotative motion to the ski supporting member.

5. In combination with an aircraft undercarriage including a landing wheel; a ski supporting structure mounted on the undercarriage adjacent said wheel and in alignment therewith in a fore and aft direction, said supporting structure including bearing means having an axis extending fore and aft of the aircraft within the plane of the wheel, said supporting structure also including a ski supporting member mounted on the bearing means and oscillatable thereon about said axis, said ski supporting member being spaced from the wheel lengthwise of such axis; a ski mounted solely on such supporting member to extend in parallelism with said axis and spaced radially from such axis a distance to occupy positions respectively contiguously above and below the wheel attendant to oscillative adjustment of the supporting member selectively between positions spaced 180° about said axis, the ski having a wheel-engageable portion disposed beneath the wheel when the ski is below such wheel, and the ski supporting structure possessing resiliency to facilitate deflection thereof by the weight of the aircraft to press the wheel downwardly onto said wheel engageable portion of the ski while the ski is in contact with a landing surface.

6. The combination set forth in claim 5, wherein the ski supporting structure comprises an inner cylinder co-axial with said fore and aft axis, wherein the ski supporting member includes an outer cylinder mounted coaxially on the inner cylinder and oscillatable thereon, wherein there is ski mounting means on the outer cylinder, and wherein there is means for oscillating the outer cylinder and such ski mounting means.

References Cited in the file of this patent

UNITED STATES PATENTS

| | | |
|---|---|---|
| 977,288 | Euchenhofer | Nov. 29, 1910 |
| 1,079,201 | Wise | Nov. 18, 1913 |
| 1,101,458 | Levoy | June 23, 1914 |
| 1,128,698 | Levy | Feb. 16, 1915 |
| 1,805,914 | Larsen | May 19, 1931 |
| 1,946,309 | Coffman | Feb. 6, 1934 |
| 2,237,970 | Pabst | Apr. 8, 1941 |
| 2,247,562 | Santen | July 1, 1941 |
| 2,636,289 | Pryor | Apr. 28, 1953 |

FOREIGN PATENTS

| | | |
|---|---|---|
| 223,618 | Great Britain | Oct. 24, 1924 |